Patented Jan. 18, 1944

2,339,476

UNITED STATES PATENT OFFICE 2,339,476

TREATMENT OF POLY-OLEFINIC ETHERS AND PRODUCT PRODUCED THEREBY

George W. Hearne, Berkeley, and Donald S. La France, Walnut Creek, Calif., assignors to Shell Development Company, San Francisco, Calif., a corporation of Delaware No Drawing. Application September 30, 1940, Serial No. 359,091

4 Claims. (Cl. 260—614)

The present invention relates to the treatment of poly-olefinic ethers, and more particularly pertains to the production of a number of compounds, some of which are novel, by treating symmetrical and/or unsymmetrical ethers in which each radical attached to the ether oxygen atom contains at least one olefinic linkage between two non-tertiary carbon atoms and is in non-vinyl position relative to the ether oxygen atom.

In one of its embodiments, the present invention is directed to the treatment of di-allyl type ethers to produce various compounds which are valuable per se or which may be employed as intermediates in the production of a number of useful organic compounds. The term "di-allyl type ether," as employed herein and in the appended claims, refers to ethers wherein each radical is attached to the ether oxygen atom via a saturated carbon atom and wherein each of said radicals contains an olefinic linkage in allyl position with respect to the ether oxygen atom. Another embodiment of the present invention relates to a novel class of compounds, namely, polyhalogenated ethers in which each radical attached to the ether oxygen atom contains at least two halogen atoms attached to adjacent non-tertiary saturated carbon atoms neither one of which is in alpha position.

It is known that unsaturated halogenated hydrocarbons containing a hydrolyzable halogen atom linked to a saturated carbon atom, may be treated with aqueous metal hydroxide solutions to produce unsaturated alcohols. This hydrolysis is particularly applied to the production of unsaturated monohydric alcohols of the allyl type, such as allyl alcohol, by effecting the hydrolysis of the corresponding allyl type halides, such as allyl chloride, allyl bromide, allyl iodide, methallyl chloride, beta-ethyl allyl chloride, and the like. It is also known that the hydrolysis of such unsaturated halogenated hydrocarbons containing a hydrolyzable halogen atom linked to a saturated carbon atom, and particularly the hydrolysis of allyl type halides when effected with an aqueous metal hydroxide solution, such as an aqueous solution of an alkali metal hydroxide, always gives an ether as a by-product. In fact, in many instances of such hydrolysis, the amounts of ether thus formed are so large that the disposal of this comparatively useless material presents a serious difficulty if the hydrolysis process is practiced on a large scale.

One of the methods of producing glycerol includes the steps of hydrolyzing an allyl halide, such as allyl chloride, to allyl alcohol, which is then converted to glycerol via halogenation of the allyl alcohol to dihalohydrin and hydrolysis of the latter to glycerol. As stated, the hydrolysis of the allyl halide, especially when effected at elevated temperatures and pressures and in the presence of aqueous solutions of an alkali metal hydroxide, results in the formation of di-allyl ether, this by-product being a relatively useless material.

It is therefore one of the main objects of the present invention to avoid the above and other defects, and to provide a method whereby non-vinyl type unsaturated ethers may be treated to produce valuable organic compounds. Another object of the invention is to provide a process whereby di-allyl type ethers, such as those formed as a by-product during hydrolysis of the corresponding allyl type halides, may be readily converted into various organic compounds which may be valuable per se or as intermediates in the production of still other desirable and useful organic compounds. A still further object is to convert di-allyl ether, e. g. produced as a by-product from hydrolysis of allyl chloride, into glycerol dihalohydrin which may then be converted to glycerol. Other objects of the present invention will become apparent from the following description.

It has now been discovered that bis non-vinyl type unsaturated ethers, and particularly the di-allyl type ethers, may be readily halogenated via addition by effecting the reaction in the liquid phase, or at least in the presence of a liquid phase in the reaction zone. Although such halo-addition may be applied to all unsaturated ethers in which each radical attached to the ether oxygen atom possesses at least one olefinic linkage in non-vinyl relationship to the carbon atom connecting such radical to the ether oxygen atom, it is preferable to exclude those ethers of the above defined class in which the unsaturated carbon atoms linked by the aforementioned double bonds are of tertiary character. This is due to the fact that when such ethers containing tertiary unsaturated carbon atoms, are subjected to the action of a halogen even under such temperature and pressure conditions as will insure a liquid phase in the reaction zone, the resulting reaction product is a complex mixture containing products of halo-substitution into the original unsaturated ether, as well as products resulting from induced halo-substitution into the ether halogenated via addition and/or direct halo-substitution. For example, when dimethallyl ether is chlorinated even in the liquid phase, i. e. at a temperature of below about 134° C., the reaction product is a complicated mixture from which it is difficult to isolate any bis- (beta, gamma, dichlor isobutyl) ether. Apparently, even at temperatures below 20° C., the primary reaction is one of substitution rather than of halogen addition. In fact, the nature of the reaction mixture is greatly complicated by the number of substitution reactions possible, and also by the fact that hydrogen halide, formed as a by-product of such halo-substitution reactions, also reacts with the olefinic linkages or double bonds of the starting material and of the halo-substituted unsaturated ethers formed in the course of the reaction.

The non-vinyl type unsaturated ethers which may be halogenated, via addition, according to one phase of the present invention, may be generally represented by the formula

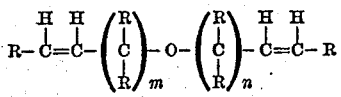

wherein each R represents a substituent which may be the hydrogen atom, or an alkyl, aryl, aralkyl, alkenyl, aralkenyl, alicyclic or heterocyclic radical which may be further substituted, and wherein $m$ and $n$ represent like or different positive whole numbers. As will be seen from the above general formula, even when $n=1$, the ether does not contain an olefinic linkage in vinyl position. In other words, each radical is always attached to the ether oxygen atom by means of a saturated carbon atom which may be of primary, secondary or tertiary character. Also, it is to be noted that the unsaturated carbon atoms in the radicals attached to the ether oxygen atom are non-tertiary, i. e., each have at least one hydrogen atom attached thereto. A particularly suitable group of ethers which may be treated according to the present process comprises the above-defined di-allyl type ethers of the general formula

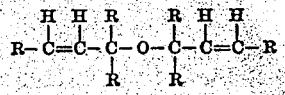

in which R represents a substituent which may be the hydrogen atom or an alkyl, aryl, aralkyl, alkenyl, aralkenyl, alicyclic or heterocyclic radical which may or may not be further substituted. The aforementioned ethers may be symmetrical or asymmetrical with respect to the ether oxygen atom. Although all di-unsaturated ethers of the above-defined class may be halogenated via addition to produce the corresponding tetrahalogenated ethers, it is not intended to imply that the halogenation of all of the poly-unsaturated ethers defined above, when effected under identical operating conditions, will result in the production of identical or even similar yields of the corresponding halogenated ether. As will be pointed out below, the optimum conditions will vary considerably depending on the primary material employed, the halogen used, etc. For instance, it is possible that certain di-unsaturated ethers having highly branched structures in close proximity to the unsaturated carbon atoms to be halogenated, may require relatively more rigorous conditions, for example, due to steric hindrance of the branched chains. As an example of such compounds reference may be made to bis (1,1,3-triphenyl allyl) ether, and the like.

The following is a non-limiting, representative list of poly-unsaturated ethers which are halogenated, via addition, according to the process of the invention:

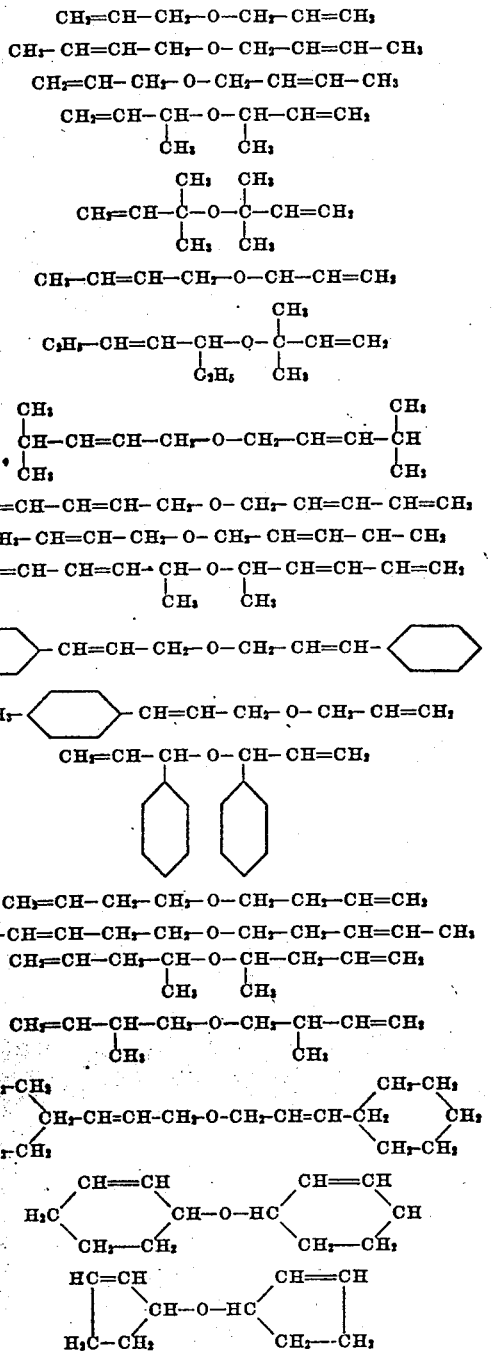

and the like, and their homologues and analogues, as well as substitution products. In fact, all organic compounds of the defined and hereinabove exemplified class in which each radical attached to the ether oxygen atom contains an olefinic linkage between two non-tertiary carbon atoms and in which such olefinic linkage is in non-vinyl position with respect to the ether oxygen atom, may be employed as the primary material which is to be treated according to the present process to produce various valuable organic compounds. A particularly suitable group of unsaturated ethers are those wherein the radicals attached to the ether oxygen atom are hydrocarbon radicals each of which contains only a single olefinic linkage in non-vinyl, and preferably allyl position, with respect to the ether oxygen atom. This olefinic linkage should be between two adjacent unsaturated carbon atoms each of which is directly linked to at least one hydrogen atom. As noted above, these preferred di-unsaturated ethers may or may not be symmetrical. Furthermore, the preferred group comprises those di-unsaturated ethers of the defined class which are liquid under normal conditions.

The halogenation of the defined class of unsaturated ethers is to be effected in the liquid phase, or at least in the presence of a liquid film or phase in the reaction zone. In view of this, the upper temperature limit will vary with the unsaturated ether subjected to the additive halogenation reaction and with the particular reaction product produced. Since the primary material, i. e., the poly-unsaturated ether, is normally soluble in the reaction product (the halogenated ether produced by the addition of at least two molecules of the halogen, i. e. chlorine, bromine, iodine and/or fluorine, to each molecule of the unsaturated ether of the described class), the upper temperature limit is the boiling point of such reaction product. For example, in the case of the chlorination of diallyl ether according to the present process, if the distillation is effected under vacuo, the reaction should be effected below about 114° C., which is the approximate boiling temperature at 1 mm. pressure of bis (beta,gamma-dichlor propyl) ether. However, generally speaking, it is preferred to effect the reaction at lower temperatures at which the ether to be halogenated is in a liquid state. In fact, the use of temperatures below 20° C. is frequently desirable. For instance, in the above mentioned additive chlorination of diallyl ether, the preferred temperature should be below about 90° C., temperatures of 0° C., and even still lower temperatures, having been found to give excellent yields of the desired chlorinated ether. However, higher and lower temperatures may be employed if necessary or desirable.

The halogenation reaction may be effected in a batch, intermittent or continuous manner, and at any suitable pressure. For example, the unsaturated ether may be introduced into a reaction vessel and maintained therein under conditions of pressure and temperature which insure the maintenance of the ether in the liquid state, the halogen being continuously or intermittently conveyed therethrough, e. g. by bubbling with or without additional agitation, until the amount of halogen thus introduced is substantially equal to that theoretically necessary for the saturation of the two olefinic linkages of the ether treated. In the alternative, the unsaturated ether and the halogen may be commingled and conveyed through a reaction zone wherein the reactants are maintained in a state of agitation and in contact with each other for a period of time sufficient to effect the desired halo-addition. Thereafter, the reaction mixture may be subjected to a water washing or the like to remove any hydrogen halide formed, thereby decreasing the tendency of side reactions, such as addition of hydrogen halide to the unsaturated ether. Such a procedure is particularly adapted when the reaction is effected in the presence of a liquid phase, i. e. when the reaction temperature is above the boiling point of the ether treated but below the boiling temperature of the reaction product or products. Also, the mentioned process is applicable to the halogenation via addition of the relatively more reactive di-unsaturated ethers, such as those having a tertiary unsaturated carbon atom.

The reaction products resulting from the addition of a halogen to the above-defined class of bis-unsaturated non-vinyl type ethers, i. e. ethers in which each organic radical attached to the ether oxygen atom contains an olefinic linkage in non-vinyl position with respect to the ether oxygen atom, results in the formation of a novel class of compounds which may be valuable per se or useful in various chemical syntheses. This new class of compounds may be generally represented by the formula

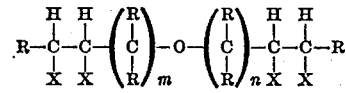

wherein each X is a halogen atom, $m$ and $n$ are like or different positive whole numbers, while each R represents the hydrogen atom or an alkyl, aryl, aralkyl, alkenyl, aralkenyl, alicyclic or heterocyclic radical which may or may not be further substituted. A particularly useful group of novel compounds which may be prepared according to the present invention comprises tetrahalogenated ethers of the general formula

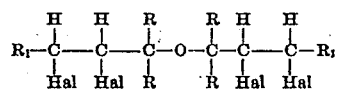

in which each R and $R_1$ represents the hydrogen atom or a hydrocarbon radical, and particularly wherein each R represents the hydrogen atom, while each $R_1$ is either a hydrogen atom or a saturated aliphatic hydrocarbon radical. This latter group of compound may also be generically described as bis (beta, gamma dihalo alkyl) ethers. A specific example of this group of novel compounds is bis (beta, gamma-dichlor n-propyl) ether. This new compound is a high-boiling, water-insoluble liquid, boiling at about 114° C. at 1 mm. pressure. It has a specific gravity of between about 1.383 and about 1.384 at 20° C./4° C., and a refractive index $N_D^{20}$ of between about 1.497 and about 1.498. The properties possessed by this new compound, as well as by the whole group of these novel organic compounds, adapt them admirably for use in organic synthesis, as well as for other purposes. For example, the aforementioned bis (beta, gamma-dichlor n-propyl) ether may be employed as a high-boiling, chlorinated solvent and extractant, being a good selective solvent for oils and for hydrocarbons. Also, the new polychlorinated ether may be substituted for dichlorethyl ether and like solvents in lubricants for use in high pressure lubrication, or wherever undue volatilization of the lower boiling dichlorethyl ether would effect a breaking of the film of the lubricant.

The aforementioned polyhalogenated ethers may be employed in the manufacture of various organic compounds. For instance, they may be subjected to dehydrohalogenation, to hydration in an acid media to form the corresponding polyhalogenated hydroxy compounds, or again to hydrolysis in a neutral or substantially neutral solution to form the corresponding ethers of polyhydric alcohols.

As an example of the outlined uses of the novel polyhalogenated ethers, the bis (beta, gamma-dichlor propyl) ether (produced by the liquid phase chlorination of diallyl ether) may be treated with a basic-acting compound under dehydrochlorinating conditions to produce bis (beta-chlor allyl) ether which is a colorless, mobile liquid with a characteristic odor. This unsaturated chlorinated ether readily polymerizes upon heating to a tough, black, rubber-like solid which is insoluble in benzene, ethyl alcohol, ethylene dichloride, acetone, and other common organic solvents. The monomeric bis (beta-chlor allyl) ether may be compounded with gums, waxes, fillers, plasticizing agents, etc. to form plastic masses useful in arts.

It is to be noted that the dehydrohalogenation of bis (beta, gamma-dichlor propyl) ether resulted in the production of an ether in which the olefinic bonds are in allyl position, while the chlorine atom remains on the unsaturated carbon atom closest to the ether oxygen atom. Therefore, if one analyzes the whole process, namely the liquid phase chlorination of the diallyl ether and the subsequent dehydrochlorination of the resulting tetrachlorinated dipropyl ether, it may be stated that the dehydrochlorination step re-establishes the olefinic linkage between the same carbon atoms which were unsaturated in the primary or original di-unsaturated ether treated, while retaining, in each radical attached to the ether oxygen atom, a halogen atom which is attached to the unsaturated carbon atom nearest to the ether oxygen atom. This occurs, at least to a certain degree, irrespective of the specific character of the poly-unsaturated ether of the defined class employed as the primary material. In other words, irrespective of whether the di-unsaturated ether halogenated, via addition, according to the present process, is an ether in which each radical attached to the ether oxygen atom contains an olefinic linkage in allyl position or between carbon atoms further removed from the ether oxygen atom, the treatment of such polyhalogenated ether with a basic-acting material under dehydrohalogenating conditions will re-establish (in each of the two radicals attached to the ether oxygen atom) an olefinic linkage between the originally unsaturated carbon atoms. Also, at least a portion of the product will retain (also in each of these radicals) a halogen atom on the unsaturated carbon atom nearest to the ether oxygen atom.

Although the above described bis (halo alkylene) ethers, or the like, may be produced by refluxing the defined class of novel polyhalogenated ethers with an alcoholic solution of an alkali, it is preferred to execute the dehydrohalogenation reaction in the presence of a dilute aqueous solution or suspension of basic or basic-acting compound. A suitable basic compound is one which in the presence of a relatively large amount of water is capable of effecting the removal of at least two mols of hydrogen halide from one mol of the symmetrical or asymmetrical ether, in which each radical contains at least two halogen atoms on adjacent non-tertiary carbon atoms neither of which is in alpha-position to the ether oxygen. The basic compound may be any suitable basic metal compound such as metal oxides, hydroxides, carbonates, borates, bicarbonates, etc., which are alkaline-reacting and capable of effecting the desired result. A preferred group of basic-reacting compounds includes the alkali- and alkaline-earth metal hydroxides, as well as suitable basic-reacting salts of strong bases and weak acids such as the carbonates, bicarbonates, borates, and the like.

Preferably the aforementioned dehydrohalogenation reaction is to be effected at relatively high temperatures. For instance, excellent results are obtainable when the temperature employed is in the neighborhood of the boiling temperature of the dehydrohalogenated product obtained. As to pressure, the dehydrohalogenation is usually effected at substantially atmospheric pressures, although higher and particularly lower pressures may frequently be desirable. For example, it has been found that the use of reduced pressures, by permitting the utilization of correspondingly lower reaction temperatures, increases the yield of the desired product by decreasing the tendency of side reactions.

The hydration of the described class of novel polyhalogenated ethers to the corresponding polyhalogenated hydroxy compounds is effected by treating the ethers with water at elevated temperatures in an acid medium and in the presence or absence of an acid-acting catalyst. As an example, the hydration of bis (beta-gamma dichlor n-propyl) ether, under refluxing conditions, with one and two normal aqueous solutions of hydrogen chloride, both in the presence and absence of cuprous chloride or the like, resulted in the formation of a reaction mixture which contained glycerol dichlorhydrin. In this connection it must be noted that glycerol dichlorhydrin may be readily hydrolyzed to glycerol. This is important since the present process thus increases the total yield of glycerol which may be produced from using allyl chloride as a primary material, it being noted that diallyl ether (employed herein as a starting material) is a by-product of one method of manufacturing glycerol from allyl chloride. There is no intention, however, of limiting the process to the aforementioned hydration with aqueous hydrochloric acid solutions, nor to the use of cuprous chloride as a catalyst. In fact, it may be noted that acid concentrations higher than those given above may improve the yield of the desirable polyhalogenated hydroxy compounds.

The following examples will further illustrate the various phases of the present invention, it being understood that the invention is not restricted to these examples, but is co-extensive with the scope of the appended claims.

*Example I*

About 600 cc. of diallyl ether were introduced into a vessel and maintained in the liquid state by chilling to a temperature of between about −10° C. and about −30° C. throughout the chlorination reaction which was effected by slowly bubbling chlorine gas through the liquid diallyl ether. The rate of introduction of the chlorine varied somewhat. However, the average rate was about 2.3 grams per minute, with the maximum never exceeding about 4.0 grams per minute. The chlorine addition was continued until about 89% of the theoretical amount of chlorine had been thus applied. At this point the chlorine addition was terminated because an evolution of hydrogen chloride indicated that side-reactions of the type of halo-substitution began to occur. The reaction mixture was then withdrawn from the reaction vessel, and was washed with water, dried and then fractionated under a reduced pressure. The main product thus recovered was a water-insoluble liquid boiling at about 114° C. at 1 mm. pressure. An analysis of this liquid showed that it was bis (beta, gamma-dichlor propyl) ether, the structural formula of which is

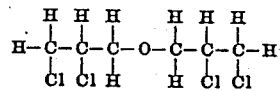

Although the yield of this novel tetrachlorinated ether was only equal to about 54 mol per cent, it is considered that considerably greater yields may be obtained with a uniform rate of chlorine addition as well as the method of recovering the novel ether from the products of reaction, it having been noted that some product decomposition occurred in the initial stages of the fractional vacuum distillation of the crude product because the temperature (determined by the reduced pressure first chosen for the distillation) was somewhat higher than necessary. This caused some decomposition and loss of product to occur in the initial stages of the fractionation, but stopped upon further reduction of pressure with the corresponding lowering of temperature.

Example II

Chlorine gas was slowly introduced at an average rate of about 3.0 grams per minute, into about 600 cc. of dimethallyl ether maintained at a temperature of about −20° C. The chlorine addition was continued until about 96 per cent of the theoretical amount of chlorine had been thus added. The reaction mixture was washed with water, dried and then fractionated. Although some bis (beta, gamma-dichlor isobutyl) ether was isolated, the principal reaction products obtained were those produced by chlor-substitution, rather than via chlorine addition. These chlorinated ethers boiled between about 60° C. and 150° C. at 5 mm. pressure.

Example III

About 30 cc. of bis (beta, gamma-dichlor n-propyl) ether, which was obtained by chlorination, via addition according to the process described in Example I, were slowly distilled with a 10% aqueous solution of sodium hydroxide employed in an amount in excess of that stoichiometrically necessary for removing 2 mols of hydrogen halide per mol of the chlorinated ether employed. The non-aqueous phase of the distillate was then dried and fractionated under a reduced pressure. One of the fractions thus produced had a boiling point of about 65° C. at 10 mm. of pressure, and about 173° C. at 760 mm. of pressure. This product had a specific gravity of about 1.176 at 20° C./4° C., and a refractive index $N_D^{20}=1.476$. The chemical formula of this compound is believed to be

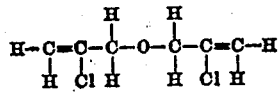

Although the yield of bis (beta-chlor allyl) ether thus obtained was only about 50 mol per cent, it could be readily increased by operating at a reduced pressure rather than normal pressure and permits a correspondingly lower operating temperature which gives a decreased tendency of side reactions and by improving the method of recovery with more efficient fractionating apparatus.

Although the examples described hereinabove are directed to the addition of chlorine and to dehydrochlorination of the resultant tetrachlorinated ether, the present invention is applicable to the addition of any halogen and to the treatment of the resultant polyhalogenated ether. Also, the ether may contain different halogens. For instance, the di-unsaturated ether containing bromine attached thereto may be subjected to chlorination via addition according to the present invention to produce an ether containing both chlorine and bromine.

We claim as our invention:

1. Bis (beta, gamma-dichlor propyl) ether.
2. Bis (beta, gamma-dihalo propyl) ether.
3. A polyhalogenated ether having the general formula

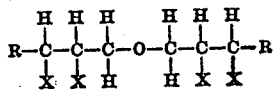

wherein each X represents a halogen and wherein each R represents a substituent selected from the group consisting of the hydrogen atom hydrocarbon radicals.

4. A polyhalogenated ether wherein each radical attached to the ether oxygen atom is an aliphatic hydrocarbon radical wherein the carbon atoms in beta and gamma positions with respect to said oxygen atom are each directly linked to a halogen atom and to at least one hydrogen atom.

GEORGE W. HEARNE.
DONALD S. LA FRANCE.

CERTIFICATE OF CORRECTION.

Patent No. 2,339,476. January 18, 1944.

GEORGE W. HEARNE, ET AL.

It is hereby certified that error appears in the printed specification of the above numbered patent requiring correction as follows: Page 5, second column, line 40, claim 3, after the word "atom" insert --and--; and that the said Letters Patent should be read with this correction therein that the same may conform to the record of the case in the Patent Office.

Signed and sealed this 28th day of March, A. D. 1944.

Leslie Frazer (Seal)                                          Acting Commissioner of Patents.